Sept. 6, 1960 M. A. OLGIATI 2,951,456
BREAD MAKING MACHINE
Filed Dec. 15, 1958 3 Sheets-Sheet 2
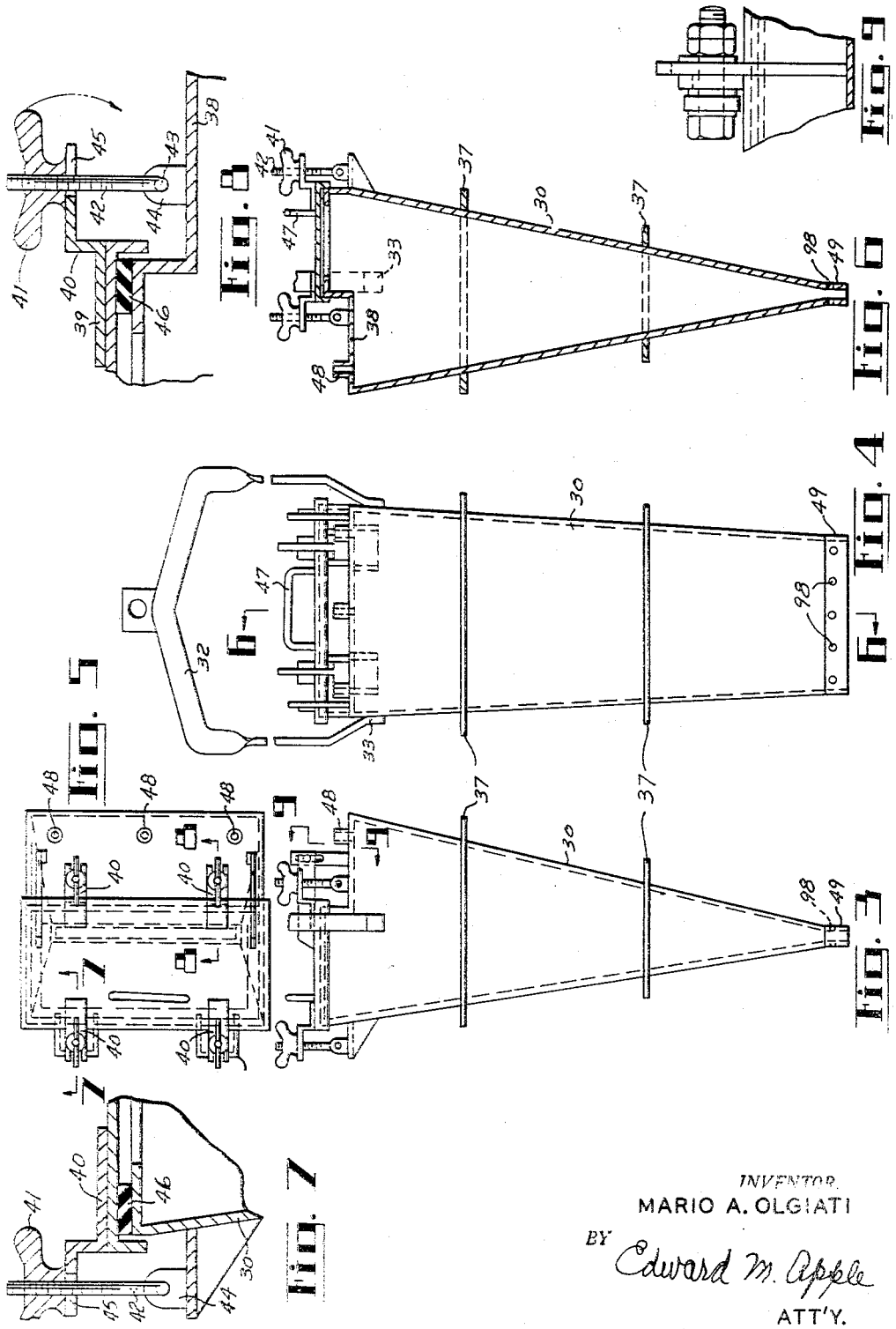
INVENTOR.
MARIO A. OLGIATI
BY Edward M. Apple
ATT'Y.

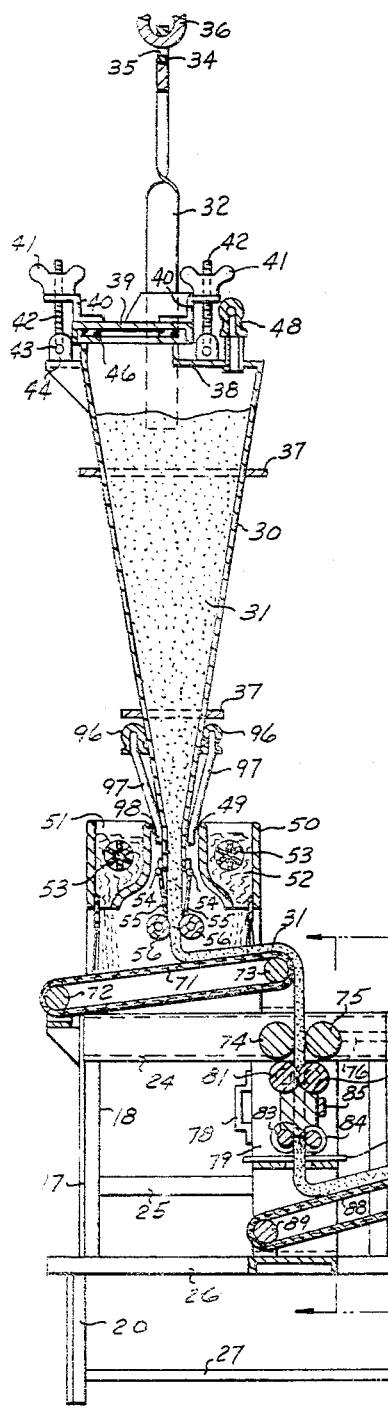

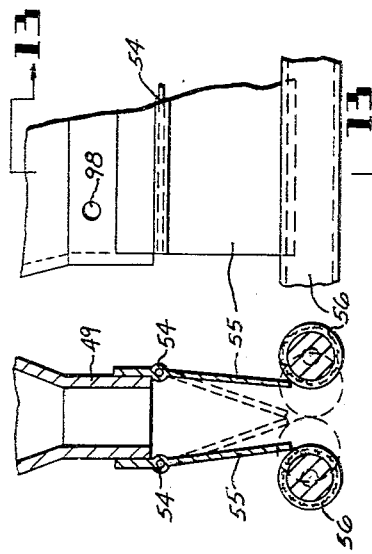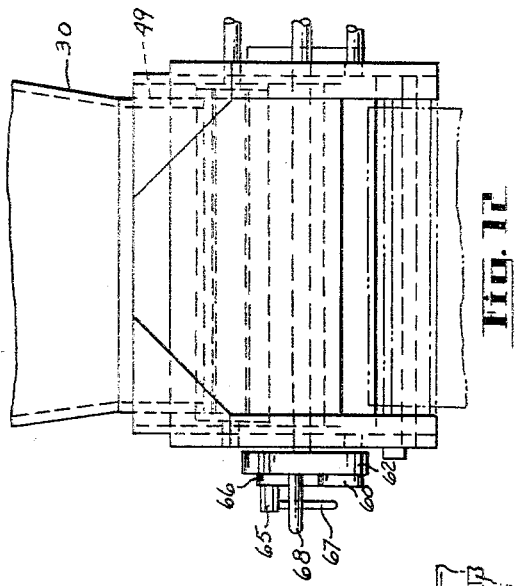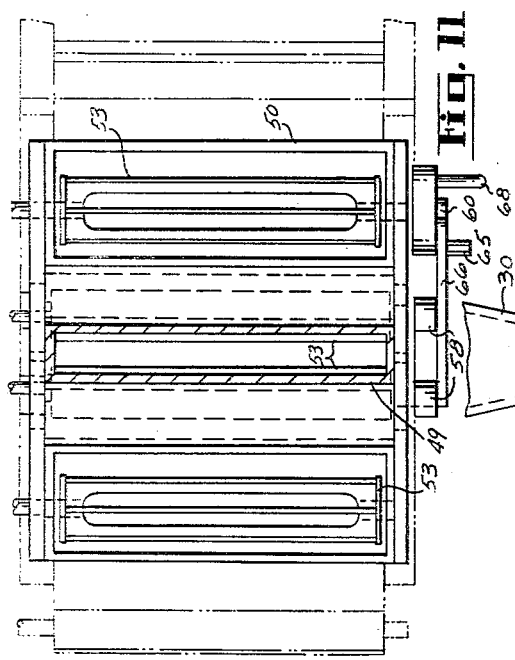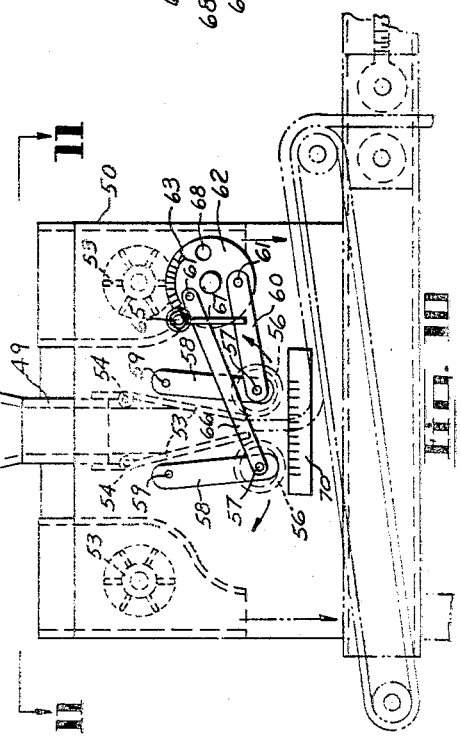

United States Patent Office 2,951,456
Patented Sept. 6, 1960

2,951,456

BREAD MAKING MACHINE

Mario A. Olgiati, 35300 Gratiot Ave.,
Mount Clemens, Mich.

Filed Dec. 15, 1958, Ser. No. 780,396

2 Claims. (Cl. 107—4)

This invention relates to bread-making machinery and has particular reference to a machine for automatically forming bread, rolls, bread sticks, doughnuts and the like.

An object of the invention is to generally improve machines of the character described in United States Letters Patent No. 2,276,545, and No. 2,382,657 previously issued to me.

Another object of the invention is to provide a machine of the character indicated, which has a novel hopper for extruding the dough under pressure into the machine.

Another object of the invention is to provide a pressurized hopper for feeding the dough into the machine, with novel means associated therewith, for finely calibrating the thickness of the dough to be fed into the machine.

Another object of the invention is to provide a machine of the character indicated, which is constructed and arranged so that the dough may be dusted, or seeded, on both sides, as it is being fed into the machine.

Another object of the invention is the provision of a device of the character indicated, which is constructed and arranged with a novel cutting and forming roll assembly, whereby working rollers of different size and conformation may be interchanged in the machine, without the necessity of tearing down the machine, with its resultant non-productivity for long periods of time, and without the necessity of using special tools for making such changes.

Another object of the invention is to provide a machine of the character indicated, which is constructed and arranged with novel means for lubricating the several parts, where extreme pressures are exerted on the dough during the infeeding operation.

The foregoing and other objects and advantages of the invention will become more apparent as the description proceeds, reference being made from time to time to the accompanying drawings forming part of the within disclosure, in which drawings:

Fig. 1 is a vertical section taken through a machine embodying the invention. This section is taken substantially on the line 1—1 of Fig. 2.

Fig. 2 is an elevational view, with parts broken away and parts in section and looking from right to left in Fig. 1.

Fig. 3 is a side elevational view of the hopper mechanism, illustrated in Fig. 1.

Fig. 4 is a front elevational view of the hopper mechanism.

Fig. 5 is a top plan view of the hopper mechanism.

Fig. 6 is a vertical section taken substantially on the line 6—6 of Fig. 4.

Fig. 7 is a section taken substantially on the line 7—7 of Fig. 5.

Fig. 8 is a section taken substantially on the line 8—8 of Fig. 5.

Fig. 9 is a section taken substantially on the line 9—9 of Fig. 3.

Fig. 10 is an enlarged detail, in elevation, of the means for calibrating the thickness of the dough extruded from the hopper, with parts dotted in to shown their relation to other parts.

Fig. 11 is a section taken substantially on the line 11—11 of Fig. 10.

Fig. 12 is a fragmentary elevational view looking from right to left of Fig. 10.

Fig. 13 is a section taken substantially on the line 13—13 of Fig. 14.

Fig. 14 is a fragmentary detail in elevation showing the lower part of the hopper and a portion of the housing enclosing the plates and rollers for calibrating the thickness of the dough.

Referring now more particularly to the drawings, it will be understood that in the embodiment herein disclosed the reference character 17 indicates the frame for supporting the several parts of the machine hereinafter described.

The frame 17 may be made of a plurality of pieces of angle iron or the like, and consists of vertical members 18, 19, 20, 21, 22, and 23, and horizontal members 24, 25, 26, 27, and other members, not shown, all of which may be secured together by welding or other suitable means.

The reference character 30 indicates in general the hopper for holding the dough 31 (Fig. 1), which is to be fed into the machine. The hopper 30 is provided with a bail 32, which is pivoted at either end as at 33, to the sides of the hopper. The bail 32 is provided with a plate 34, which has an opening therein 35 for receiving a hook 36, which is suspended from the ceiling or some other element, whereby to support the hopper 30. The hopper 30 is reinforced on the outside by means of metal plates 37, which are welded to the hopper, so that the hopper 30 may withstand the internal pressures exerted therein, as hereinafter described.

The hopper 30 is closed at the top by means of a fixed plate 38 and a cover portion 39, which is locked in position by means of hold down clamps 40, which in turn are secured by wing nuts 41, which engage threaded rods 42, which are pivoted, as at 43, to suitable brackets 44. The clamps 40 are slotted, as at 45 (Fig. 8), so that the threaded rods 42 may be swung into and out of engagement with the clamps. Suitable gaskets 46 are interposed between the fixed plate 38, and the cover member 39, to provide a pressure-tight seal. The cover portion 39 is provided with a handle 47 so that it may be lifted from the fixed plate 38, so that the hopper 30 may be filled to sufficient depth with dough.

The fixed portion 38 of the hopper is provided with two or more pressure inlets 48, so that air under pressure or other pressure medium may be introduced on top of the dough, so that the dough may be extruded under great pressure through the reduced portion 49 of the hopper, as more fully described hereinafter.

The reduced portion 49 of the hopper 30 is received in a central opening formed in the housing 50, which is compartmented, as at 51 and 52, to provide dusting bins, or hoppers, for holding flour, or seeds, or the like, which are to be deposited under and on top of the dough, as hereinafter described. The contents of the dusting bins, or hoppers, 51 and 52 are kept agitated by means of revolving agitators 53.

Pivoted, as at 54, in the housing 50 is a pair of plates 55, which define therebetween a space, which communicates with the opening in the reduced portion 49 of the hopper 30. The free ends of the plates 55 are respectively in contact with a pair of rolls 56, which are mounted for rotation in the housing 50. The rolls 56 are mounted on shafts 57 (Fig. 10). The ends of the shafts 57 are supported by the arms 58, which arms 58 are pivoted as at 59, to the housing 50. Pivotally connected to each shaft 57 are the arms 60, the opposite ends of which arms 60 are pivoted, as at 61, to a wheel 62, which has a toothed segment 63. The teeth of the segment 53 are arranged to mesh with a pinion 64, which is pivoted for rotation on a shaft 65. Also mounted on the shaft 65 outward of the pinion 64 is a cam 66 (Fig. 1), the high point of which is arranged to engage the upper lever 60. The shaft 65, the pinion 64 and the cam 66, may be rotated by means of a lever 67. When the cam 66 is brought into contact with the upper lever 60, the wheel 62 cannot be rotated, but when the cam 66 is moved out of engagement with the upper lever 60, the wheel 62 may be rotated by means of a handle 68. The rotation of the wheel 62 causes movement of the levers 60. Rotation of the wheel 62 in one direction causes the pivot points 57 to move inwardly and outward movements of the pivot points 57 cause the rollers 56 to move closer together or to move farther apart. The inward movement of the rollers 56 cause the lower ends of the plates 55 to approach each other, thereby restricting the opening between the free ends of the plates 55, whereby to reduce the thickness of the dough passing between the plates. The outward movement of the rollers 56 permits the free ends of the plates 55 to move outwardly under their own weight, thereby increasing the space between the lower ends of the plates 55, to effect a thicker layer of dough passing between the plates 55 and the rollers 56. The movement of the rollers 56 toward each other and away from each other is calibrated in fractions of an inch on a plate 70, there being a pointer, not shown, arranged for registry with the calibrations on the plate 70 to indicate the spacing between the rollers 56. After the dough 31 has been passed through the rollers 56, it is in the form of a sheet calibrated to the required thickness. As the dough 31 leaves the rollers 56, it is received on the endless belt 71, which travels over rollers 72 and 73, which are driven, together with rollers hereinafter described, by means of an electric motor, sprockets and chains (not shown), as in conventional practice.

It will be noted that the hopper 51 deposits its dust, or seeds, on the belt 71, before the belt 71 receives any of the dough 31. This causes the dough 31 to be powdered, or seeded, on the underside, as the dough is received on the belt 71. The hopper 52, however, is arranged to deposit its powder, or seeds, on top of the dough 31, after it has been received on the belt 71. This is one of the features of the invention as it dusts, or seeds, both the top and bottom of the bread stick, or the like, being made.

After the dough leaves the belt 71, it passes through a pair of feed rolls 74 and 75, which rolls are driven by the same source of power which drives the rolls 72 and 73. The dough 31 is fed by the feed rolls 74 and 75 into the cutting and forming roll assembly, which I will now describe. The cutting and forming roll assembly form no part of the within invention, except in combination with the other elements hereinabove described. The particular details of construction of the cutting and forming roll assembly are more particularly described and claimed in my co-pending application, Serial No. 780,360, filed December 15, 1958, to which reference is hereby made for greater certainty. For the purpose of this application, let it be known that the cutting and forming roll assembly comprises a self-contained unit, generally indicated by the reference character 76, which unit 76 is slidably supported on a suitable bracket 77, which is secured by any suitable means to the framework 17–27 inclusive. The unit 76 may be bodily removed from the bracket 77 by means of handles 78, which are integrated parts of the unit 76. Briefly the unit 76 consists of a pair of end plates 79 and 80, which are provided with holes therethrough, for receiving the ends of the shafts supporting the cutting rollers 81 and 82 and the forming rollers 83 and 84, which are more particularly described and claimed in my co-pending application hereinabove referred to. The end plates 79 and 80 are tied together by means of a tie bar 85. The tie bar 85 also supports a plurality of dividers or partitions 86 (Fig. 2), the construction and purpose of which are more particularly described and claimed in the co-pending application hereinabove referred to.

For the purpose of this application, suffice it to say that the rolls 81 and 82 cut or slice the sheet of dough 31 into a plurality of ribbons of dough, which ribbons of dough are then advanced to the forming rolls 83 and 84 where the ribbons are finally formed into the desired shapes, as indicated by the reference character 87, Fig. 2. The finally formed ribbons 87 are then received on an endless belt 88, which is driven by a pair of rollers 89 and 90, which in turn are driven by the common power source (not shown). The belt 88 preferably feeds the ribbons 87 to the endless belt 91 which is driven by rollers 92 in the same manner as previously described, from which belt 91 the ribbons 87 are fed to a suitable cut off device (not shown), which forms no part of the invention.

It will be understood that the cutting and forming unit 76 in the within disclosure is set up for forming bread sticks, although other types of products can be formed in the same manner by the substitution of a different unit 76 carrying other cutting rolls 81 and 82 and forming rolls 83 and 84, having the desired dimensions and conformations required for such products.

In order to prevent the dough 31 from sticking to the plates 55 and the rollers 56, I provide a lubricating mechanism, which consists of a reservoir 93 from which extends a feed pipe 94, which is provided with a shut-off valve 95 and distributor heads 96, which feed the distributor pipes 97, which extend through openings 98 formed in the reduced portion 49 of the hopper 30. This permits the lubricant to run down the inside faces of the plates 55 and onto the faces of the rollers 56.

The reference characters 99, 100, 101, 102, 103, and 104 indicate the ends of the shafts which drive the rollers previously described, all of which shafts are driven by a common power source (not shown), as in conventional manner.

It is believed that the operation of the device is obvious from the foregoing description.

Having described my invention, what I claim and desire to secure by Letters Patent is:

1. In a device of the character described in combination, an elongated tapered hopper having a reduced opening at one end, means for pressurizing the interior of said hopper, a pair of pivotable plates hinged to the outside of said hopper at the reduced end and in part defining a passageway in communication with said opening, a pair of adjustable rollers mounted immediately below said plates and adjacent to the free ends of said plates and contactable by the free ends of said plates and in part defining a space therebetween in alignment with said passageway, and means for adjusting the space between the said rollers, there being an endless belt for receiving a sheet of dough from said hopper and from between said rollers and for subsequent delivery to a slitting and forming station, and dusting means above said belt and ahead of and behind said plates for dusting the top and bottom of said dough before delivery to said station, said station comprising at least two rollers for making ribbons of said sheet and two rollers for preforming the faces of said ribbons, all of said rollers being mounted for rotation between a pair of plates forming the ends of a removable box-like structure for manually moving the same.

2. In a device of the character described in combination, an elongated tapered hopper having a reduced opening at one end, means for pressurizing the interior of said hopper, a pair of pivotable plates hinged to the outside of said hopper at the reduced end and in part defining a passageway in communication with said opening, a pair of adjustable rollers mounted immediately below said plates and contractable by the free ends of said plates and in part defining a space therebetween in alignment with said passageway and means for adjusting the space between said rollers, said last named means including pairs of pivotable arms for supporting said rollers, there being levers connecting the opposite ends of each pair of arms to a wheel, whereby upon rotation of said wheel, said rollers may be moved toward and away from each other, and there being a toothed segment on said wheel arranged to engage a pinion mounted for rotation on a shaft located near the periphery of said wheel, said shaft also having a cam thereon, arranged to contact one of said connecting levers, whereby to lock the said wheel and levers against movement.

References Cited in the file of this patent

UNITED STATES PATENTS

| | | |
|---|---|---|
| Re. 17,711 | Scruggs | June 24, 1930 |
| 771,560 | Meurell | Oct. 4, 1904 |
| 881,439 | Peters | Mar. 10, 1908 |
| 906,271 | Palmer et al. | Dec. 8, 1908 |
| 1,561,315 | Enciso | Nov. 10, 1925 |
| 1,762,268 | Green | June 10, 1930 |
| 2,119,017 | Marasso | May 31, 1938 |
| 2,276,545 | Olgiati | Mar. 17, 1942 |
| 2,382,657 | Olgiati | Aug. 14, 1945 |
| 2,599,894 | Campbell | June 10, 1952 |
| 2,642,013 | Enoch | June 16, 1953 |